United States Patent [19]
Dimitri

[11] Patent Number: 5,818,723
[45] Date of Patent: Oct. 6, 1998

[54] QUICK ACCESS DATA STORAGE LIBRARY WITH BACKUP CAPABILITY

[75] Inventor: Kamal Emile Dimitri, Tucson, Ariz.

[73] Assignee: International Business Machines Corporation, Armonk, N.Y.

[21] Appl. No.: 363,164

[22] Filed: Dec. 22, 1994

[51] Int. Cl.$^6$ .......................... G06F 17/00; G11B 17/22; G11B 5/16

[52] U.S. Cl. ................ 364/478.02; 364/478.06; 369/34; 369/38; 360/99.02; 360/99.06

[58] Field of Search .................. 364/478.01, 478.06, 364/478.02; 360/99.01, 99.02, 99.06; 414/273; 369/34–38

[56] References Cited

U.S. PATENT DOCUMENTS

| | | | |
|---|---|---|---|
| 2,521,046 | 9/1950 | Darwin | 274/10 |
| 3,554,390 | 1/1971 | Saul | 414/273 |
| 3,854,604 | 12/1974 | Peterson et al. | 414/277 |
| 3,880,299 | 4/1975 | Zollinger et al. | 414/273 |
| 5,128,912 | 7/1992 | Hug et al. | 369/38 |

FOREIGN PATENT DOCUMENTS

| | | | |
|---|---|---|---|
| 4-271057 (A) | 9/1992 | Japan | G11B 17/26 |
| 2 200 240 | 7/1988 | United Kingdom | G11B 23/04 |

*Primary Examiner*—Paul P. Gordon
*Attorney, Agent, or Firm*—Baker, Maxham, Jester & Meador

[57] ABSTRACT

The present media storage library has magazine storage bins which have front open sides and back open sides so that magazines containing data storage media can be inserted in or withdrawn from the bins from the front open sides by a front magazine picker or inserted in or withdrawn from the back open sides by a back magazine picker. Front and back transport assemblies, which provide a backup for each other, are associated with the front and back magazine pickers, respectively, for transporting magazines to magazine mounts which are located adjacent drives which, in turn, are located at first and second ends of the storage bins. A plurality of magazine mounts can be adjacent each drive for increasing the queue of requested media in close proximity to a drive. The magazines, the magazine storage bins and the magazine mounts adjacent the drives can be kept full for maximizing storage capacity, except for selected empties in some of the components for supporting an exchange scheme. The exchange scheme equalizes the load between the drives so that media is processed faster. Because of the unique configuration of the library, it is modularized for easy expansion.

23 Claims, 9 Drawing Sheets

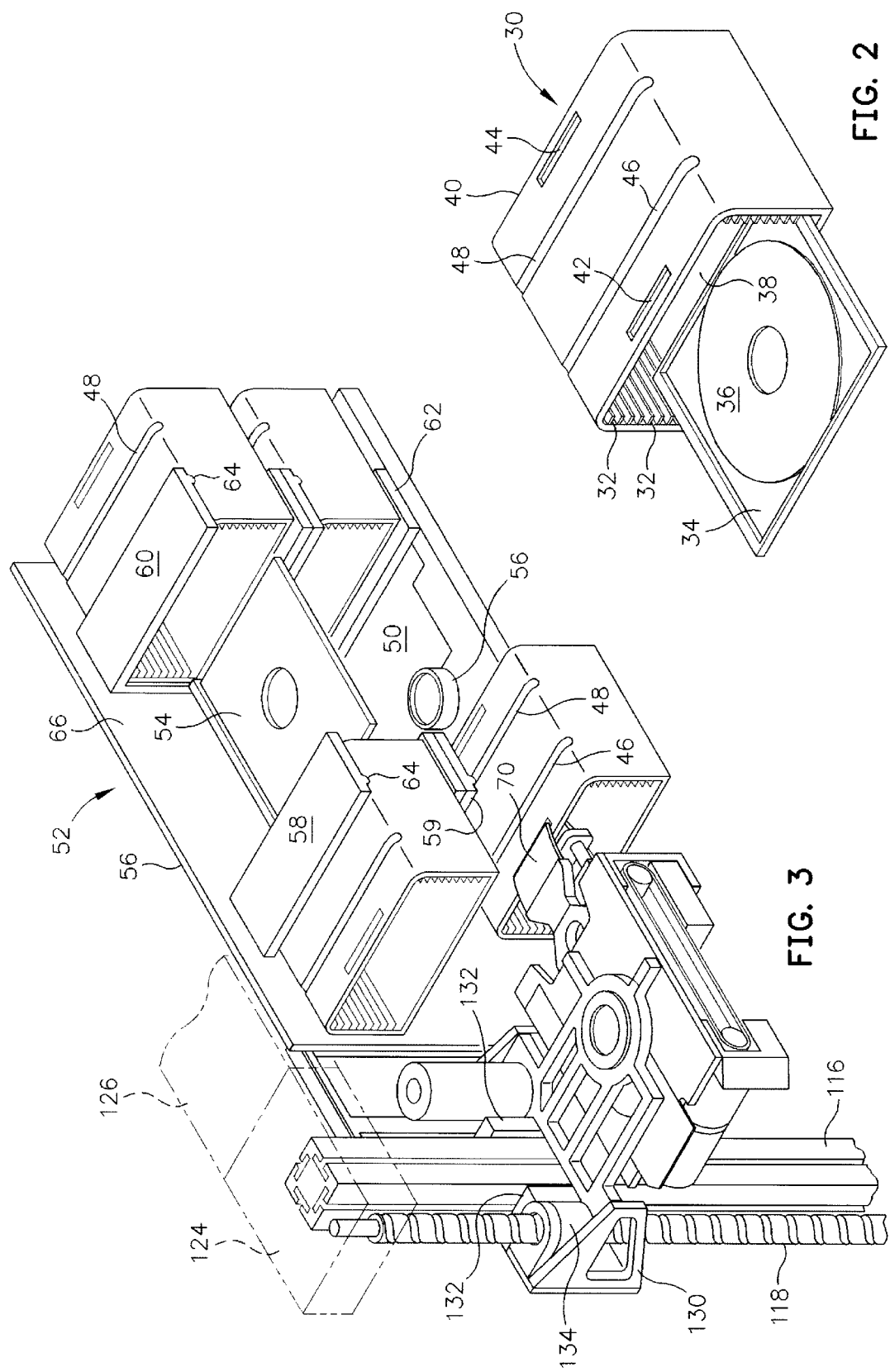

QUICK ACCESS DATA STORAGE LIBRARY WITH BACKUP CAPABILITY

BACKGROUND OF THE INVENTION

1. Field of the Invention

The present invention relates to a data storage library and more particularly to a data storage library which quickly accesses disk or cartridge media for processing with backup capability in the event of failure of a picker assembly and/or a transport assembly.

2. Description of Related Art

Data storage libraries typically include a processing capability to afford automated selection, access, and storage of library contents. A picker is employed to withdraw a medium, such as a disk or cartridge, from a storage receptacle, a transport assembly transports the picker to a drive, the picker inserts the medium into the drive, the drive records and reads data on the medium, the picker retrieves the medium from the drive, the transport assembly transports the picker back to a storage receptacle and the picker inserts the medium into the storage receptacle. The picker, transport assembly and the drive take orders from a controller which may be operated by an operator. The controller acquires information from a processor regarding locations of the media and the status of processing.

In the discussion which follows, references to the handling of media will employ the term "volume" which, according to *THE OXFORD REFERENCE DICTIONARY OF COMPUTING* (Third Ed., 1992), is a "removable unit of any data storage medium . . . ". Reference will also be made to "disk drives", "drives", and "tape drives". Relatedly, these are, more generally, "media drives"; that is, "devices used for recording on or reading from a recording medium". (*IBM DICTIONARY OF COMPUTING*, Eighth Ed., 1987).

The daily operation of a business can be highly dependent upon a data storage library. Volumes stored by a data storage library can contain information on inventory, orders placed for replenishing inventory, orders fulfilled for replenishing inventory, customer lists with addresses and phone numbers, orders placed by customers, orders filled, personnel data, financial and accounting data and much more, such as blueprints, x-ray images and cancelled check images. When the data storage library breaks down, the business can be put on hold. Accordingly, it is desirable that a data storage library have a backup capability in the event of failure of a picker and/or transport assembly.

It is also important that a data storage library quickly process requests for access to its contents. For example, if a request for a particular volume and another volume is being processed, a long delay can ensue before the requested volume is processed. For instance, if a drive is busy the requested volume will have to wait until the volume in the drive is processed; if there are other volumes waiting their turn, it will have to wait even longer. By employing more than one drive, this problem is lessened. However, prior art data storage libraries merely keep a running list of the pending requests for serial processing. When one volume is completed, it is returned to the storage receptacle and the next volume on the list is picked from its storage receptacle and transported to the drive. Time is lost by this serial handling of volume requests.

SUMMARY OF THE INVENTION

The present invention provides a data storage library which quickly processes a large number of requests and has backup capability in the event of failure of a picker and/or transport assembly. This has been accomplished by providing storage receptacles which are accessible from opposite sides. Volumes can be inserted or removed from a storage receptacle from either its front side or its back side. A pair of pickers are employed, one picker located on the front side of the storage receptacles and the other picker is located on the back side of the storage receptacles. Front and back transport assemblies are associated with the front and back pickers, respectively, for transporting volumes to at least one end of the storage receptacles where a plurality of drives are located. With the double picker and transport assembly, the library remains operational if a picker and/or transport assembly breaks down on either the front or back side of the storage receptacles.

In a preferred embodiment, each storage receptacle stores a magazine which contains one or more data storage devices such as magnetic disks. The magazine is transported to a magazine mount adjacent a drive. It is preferred that a plurality of magazine mounts be provided adjacent each drive. Accordingly, the magazines can be in a queue with respect to the drive and each magazine may have its own queue of volume requests. With this arrangement, requested volumes are located in close proximity to the drive which is to do the processing. Processing time is much quicker since the volumes are queued at the drive rather than being queued at remote storage receptacles.

Further, the invention promotes quicker processing time by providing an exchange scheme. In this regard, the number of magazine mounts for each drive can be referred to as a cluster. A cluster may contain four magazine mounts, two on the front side of the drive and two on the back side of the drive. All of the clusters can be filled with magazines except for one or more clusters which may be referred to as a floating cluster. By proper management, a requested magazine can be switched from a busy cluster to a not so busy cluster by exchanging magazines via the floating cluster. In the same manner it is desirable that each magazine have an empty receptacle so that media can be exchanged between the magazines to speed up processing. To further support the exchange scheme the storage bins are completely full except for several bins which allow exchanging magazines between the clusters and the storage bins. The number of empties in the clusters, the magazines and the storage bins can be fashioned for the particular operation being served. It should be noted that by keeping the storage bins and the magazine mounts full except for empties to serve the exchange scheme that gigabyte capacity of the library is maximized.

While the invention can be employed for transporting a single volume between the storage bins and drives, it is preferred that magazines containing volumes and a cluster of magazine mounts at each drive be employed so that the queue at each drive is maximized. The magazines not only place more volumes at a drive but the magazines at the drives can be organized to store the volumes most often requested so that the most often requested volumes are more accessible.

An object of the present invention is to provide a data storage library which quickly processes access requests and has a backup capability in the event of failure of a picker and/or transport assembly.

Another object is to provide a data storage library which queues requested volumes at a drive for speeding up processing time.

A further object is to provide a data storage library which is modularized for easy expansion, has backup in the event of failure of a picker and/or transport assembly, has maximum storage capability, locates the most requested volume close to a drive, has optimized volume queuing at a drive, has a scheme for exchanging volumes to speed up processing and can be tailored to change the number of clusters and/or volume bins in order to optimize system configuration based upon the requirements of access/hr. and access to first data.

These and other objects and advantages of the invention will become more apparent to one skilled in the art upon reading the description of the invention in light of the accompanying drawings.

DESCRIPTION OF THE DRAWINGS

FIG. 2 is an isometric view of an exemplary magazine for storing disks and a tray supporting a disk.

FIG. 3 is an enlarged isometric view of a magazine gripper sliding a magazine into a magazine mount adjacent a disk drive.

DESCRIPTION OF PREFERRED EMBODIMENTS

Figure 1:
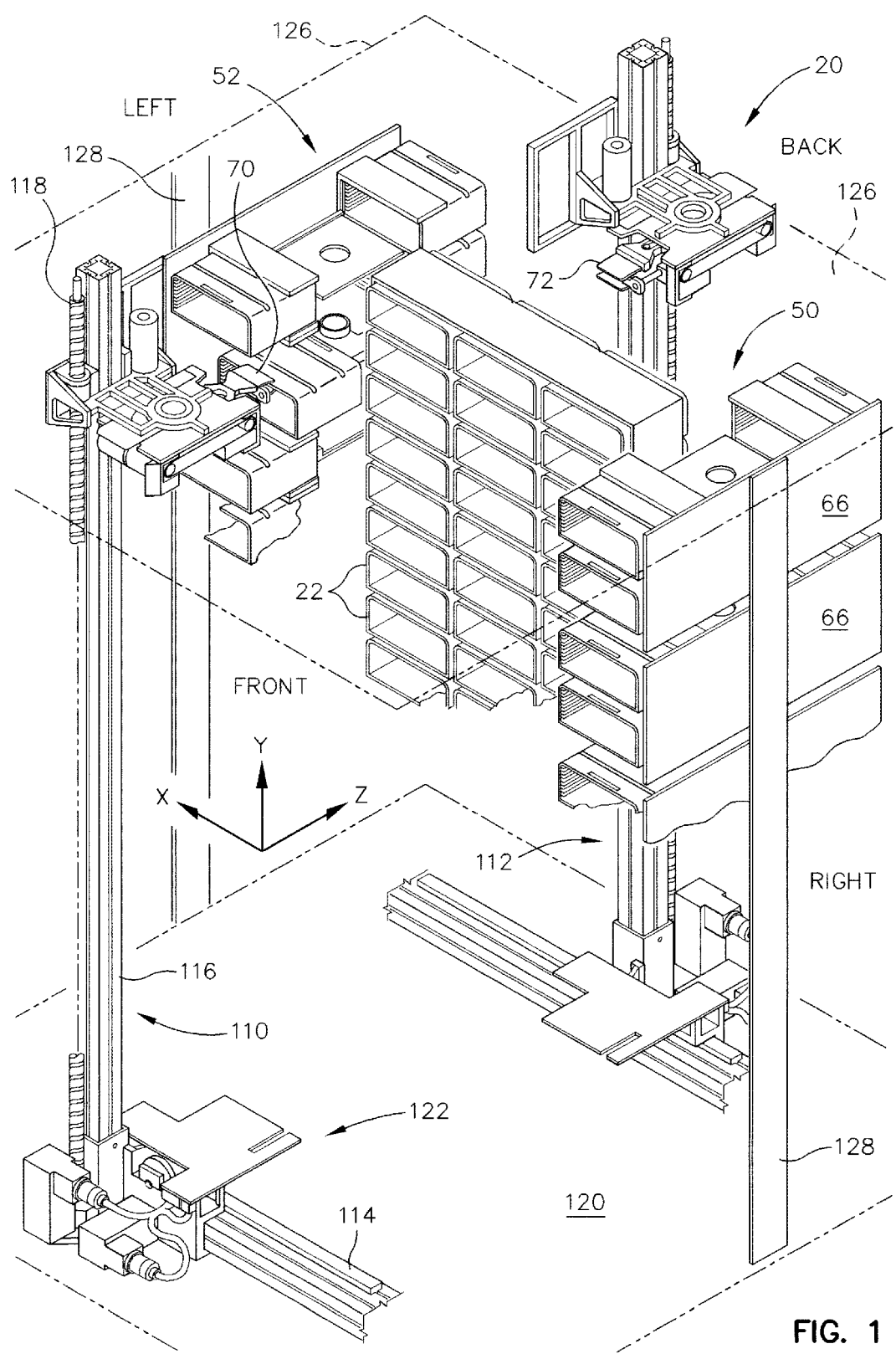
FIG. 1 is an isometric view of the present data storage library with portions removed to show various details thereof.

Referring to FIG. 1, there is illustrated a data storage library 20 which includes a plurality of magazine storage bins 22, the storage bins being arranged in rows and columns in a X-Y vertical plane. The library has front and back sides and right and left ends which are so designated only for descriptive purposes. Each magazine bin has a front open end and a back open end so that it can be accessed from opposite sides. Accordingly, a magazine stored in a storage bin can be inserted or withdrawn from either the front side or the back side of the storage bin. Such magazines contain data storage devices such as disks. Since the disks are removable storage devices, they may also be called volumes. An exemplary magazine 30 for containing disks is illustrated in FIG. 2. The magazine has a plurality of receptacles 32, each receptacle being capable of supporting a tray 34 which, in turn, supports a disk 36. The magazine 30 has front and back open ends, 38 and 40. Accordingly, the tray 34 with the disk 36 can be inserted or withdrawn from either the open end 38 or the open end 40. The magazine 30 is also provided with front and back elongated picker recesses 42 and 44 and matching elongated picker recesses (not shown) at its bottom which extend in an X direction and are adjacent the open ends 38 and 40, respectively. Intermediate the picker recesses 42 and 44, are front and back elongated mounting recesses 46 and 48 which extend in the X direction the fall width of a top of the magazine. The recesses 42, 44, 46 and 48 cooperate with components of the library to be discussed hereinafter.

As shown in FIG. 1, a plurality of disk drive and disk loader combinations 50 are arranged in a vertical column at the right end of the magazine storage bins 22 and a plurality of disk drives and disk motor combinations 52 are arranged in a vertical column at the left end of the magazine storage bins 22. A more detailed view of the left drive and left disk loader combination 52 is illustrated in FIG. 3. The disk loader is located at 54 and the disk drive is generally located at 56. The operation of these components will be discussed in more detail hereinafter.

A cluster of magazine mounts is adjacent each drive and disk loader combination as illustrated in FIG. 3. The cluster of magazine mounts includes a pair of vertically stacked magazine mounts 58 and 59 at a front side of the disk drive and disk loader combination 52, and a pair of stacked magazine mounts 60 and 62 being located adjacent the back side of the disk drive and disk loader combination 52. Each magazine mount is an elongated shaped channel which extends in an X direction. The inside surface of one of its legs is provided with an elongated rail 64 which extends in the X direction and is received by one of the magazine recesses 46 or 48 shown in FIG. 2. In FIG. 3, three of the magazine's 30 are shown completely mounted in the magazine mounts 58, 60 and 62 and one magazine 30 is shown partially mounted in the magazine mount 59. The rails 64 on the magazine mounts and the recesses 46 and 48 on the magazines insure that the magazines are firmly stored in the magazine mounts with open ends of the magazines facing the disk loader 54 so that trays with disks can be transported from the magazines to the disk drive 56. The open end of each U-shaped channel faces inwardly with respect to the library, and the closed end is fixedly mounted to a plate 66. Each U-shaped channel receives about one-half of the Y direction width of a respective magazine. It should be understood that the plates 66 can be provided with doors so as to provide manual access from the outside right and left sides of the library.

A magazine picker 70, which will be described in more detail hereinafter, is shown inserting a magazine into the bottom front magazine mount 59. When magazines are mounted in the front and back magazine mounts, the disk loader 54 can select a tray with a disk from a receptacle in any of the mounted magazines for transporting the disk to the drive 56. This type of disk loader is well known in the prior art. An exemplary disk loader is described in U.S. Pat. No. 5,228,016 issued to Wilhelm Menke on Jul. 13, 1993 which is incorporated by reference herein. As shown in FIG. 1, the data storage library is provided with a front magazine picker 70 which can withdraw and insert magazines in the front open ends of the magazine storage bins 22 and can slide magazines into the front magazine mounts and is provided with a back magazine picker 72 which can insert and withdraw magazines from the back open ends of the magazines storage bins 22 and slide magazines into the back magazine mounts.

Figure 4:
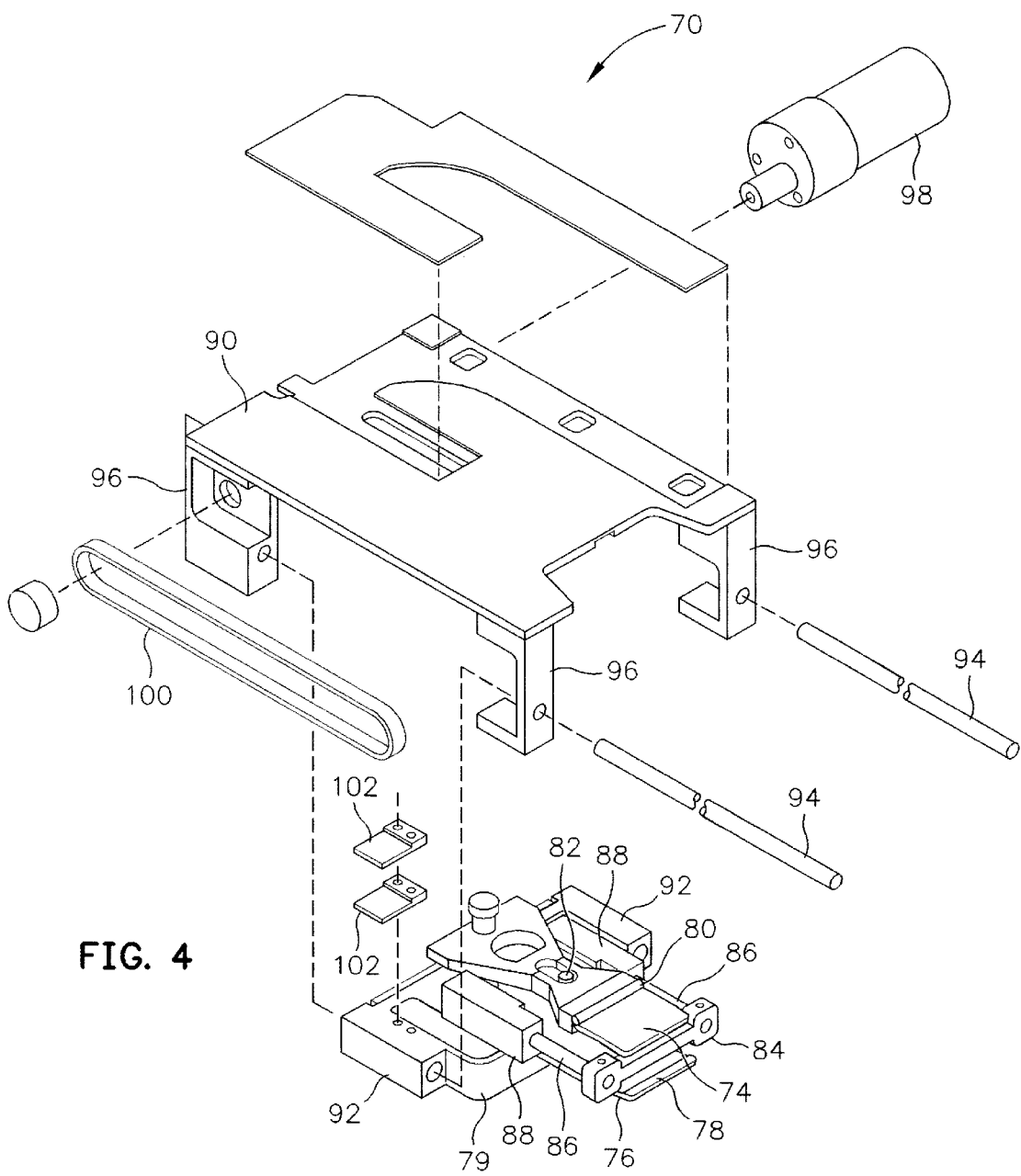
FIG. 4 is an exploded isometric view of the magazine picker.

The magazine pickers 70 and 72 are identical. An exploded illustration of the magazine picker 70 is illustrated in FIG. 4. The magazine picker 70 has top and bottom jaws 74 and 76 which have forwardly located inwardly facing lips, the lip for the bottom jaw 76 being illustrated at 78. The lips of the jaws 74 and 76 are receivable by the top and bottom recesses 42 or 44 of the magazines, so that when the jaws 74 and 76 are clamped onto the magazine, the magazine is rigidly supported by the magazine picker 70. Each jaw is pivoted relative to a support plate 79, the top jaw 74 being pivoted at 80. The jaws are opened and closed by a solenoid 82. Intermediate the jaws, is a plunger 84 which reciprocates in a Z direction for pushing a magazine into a magazine storage bin after the jaws are opened. The Z movement of the plunger 84 is caused by pistons 86 which are part of longitudinal solenoids 88. The support plate 79, which mounts the jaws 74 and 76, slides back and forth with respect to a top support plate 90, so that the jaws can move in a Z direction to withdraw or insert a magazine into a magazine storage bin. This is accomplished by providing the support plate 79 with journals 92 which slidably receive rods 94 which, in turn, are mounted at the bottom of the support plate 90 by downwardly extending flanges 96. A motor 98 is connected to the support plate 92 and operates a belt 100 which is connected to the support plate 79 by a pair of secured tabs 102. When the motor is operated, the support plate 79, which carries the jaws 74 and 76, is operated in a Z direction for inserting and withdrawing magazines from the magazine storage bins.

Figure 5:
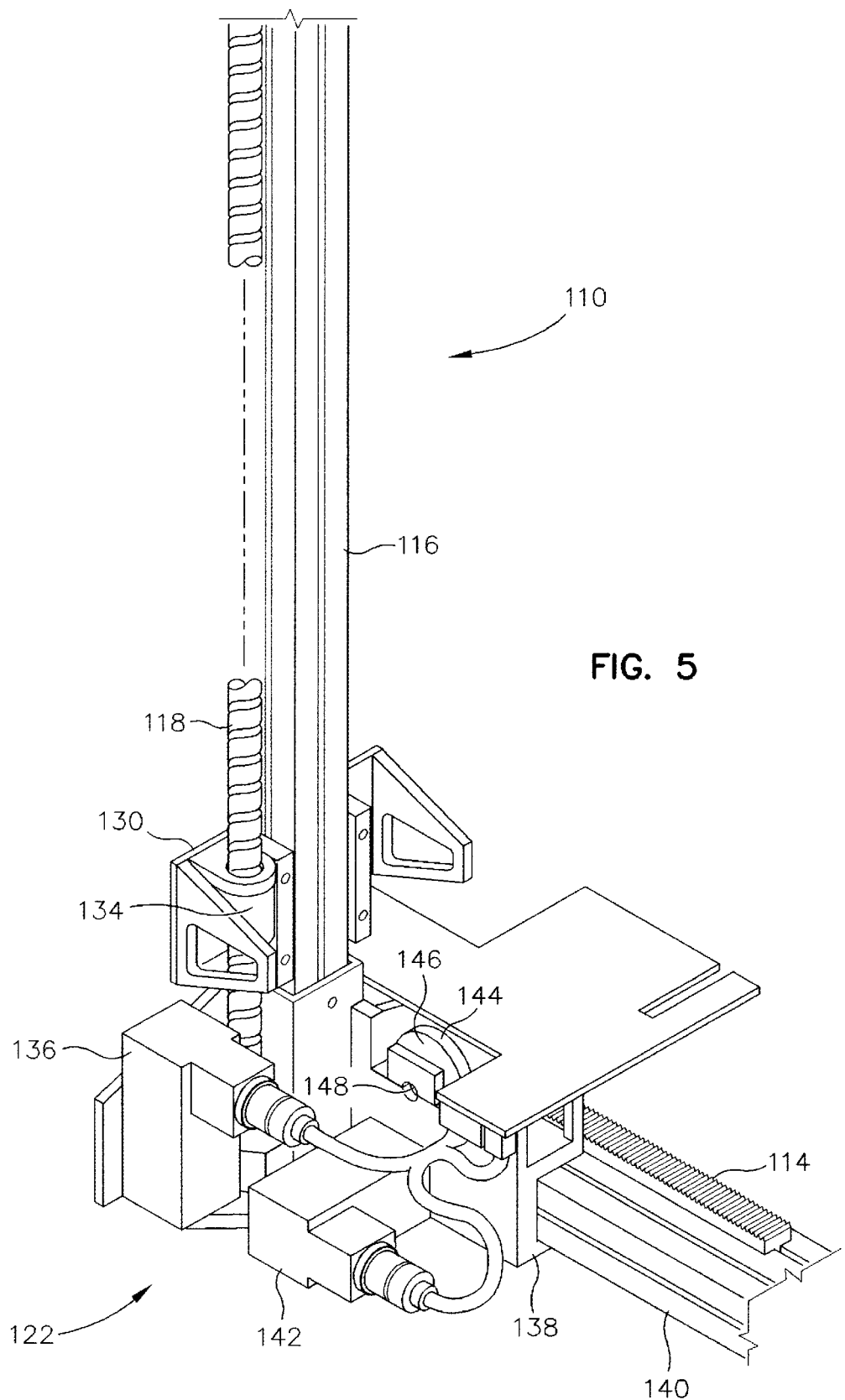
FIG. 5 is an enlarged isometric view of a transport assembly for horizontally and vertically moving the magazine picker.

As shown in FIG. 1, a front magazine transport assembly, generally shown at 110, is located on a front side of the magazine storage bins and a back magazine transport assembly, generally shown at 112, is located on a back side of the magazine storage bins 22. Since these transport assemblies are identical, only the front transport assembly 110 will be described. As shown in FIGS. 1 and 5, the transport assembly 110 includes a rack gear 114 which extends in an X direction, a guide rail 116 which extends in a Y direction and a worm gear 118 which extends in a Y direction. The rack gear 114 may be mounted on a bottom support plate 120. The bottom ends of the rail 116 and the worm gear 118 may be supported in a bottom support and bearing assembly, generally shown at 122, and the tops of the rail 116 and the worm 118 may be supported by a top support and bearing assembly 124, as shown in FIG. 3. The top bearing assembly 124 may be connected to a top support plate 126 (partially shown) which, in turn, is supported on the bottom support plate 120 by vertically extending rails 128 (see FIG. 1). The rails 128 can be employed for supporting the plates 66 which, in turn, support magazine mounts, these plates 66 being shown in FIGS. 5 and 3.

As shown in FIG. 3, the magazine picker 70 is mounted to the rail 116 and the worm gear 118 by a bracket 130, the bracket having guides 132 which slide on the rail 116 and a gear 134 which meshes with worm gear 118 and causes the bracket and magazine picker 70 to move up and down when the worm gear 118 is rotated. The worm gear 118 is rotated by the bottom assembly 122, shown in FIGS. 1 and 5. In FIG. 5, only a portion of the bracket 130 is shown in a down position. The motor for operating the worm gear 118 is shown at 136 and may be connected to the bottom of the worm gear 118 by a belt pulley arrangement (not shown) or by a gear arrangement (not shown). When the worm gear 118 is rotated clockwise or counter-clockwise, the gear 134 causes the bracket to move up and down.

The assembly 122 also has a guide 138 for sliding on a guide rail 140 of which is connected to the rack gear 114. The entire assembly 122 slides back and forth in an X direction along the rail 140, upon the operation of a motor 142. An output shaft (not shown) of the motor 142 operates a belt and pulley 144 and 146, the pulley 146 rotating a shaft 148 which, in turn, rotates a pinion gear (not shown). The pinion gear meshes with the rack gear 114 so that when the motor 142 is operated, the entire assembly including the magazine picker 70 is moved right or left with respect to the library. Flex cable (not shown) may be employed for energizing each of the motors 136 and 142.

A storage media library has now been described wherein a magazine picker, such as the front magazine picker 70, picks a selected magazine from one of the magazine storage bins, the transport assembly 110 transports the magazine picker and the magazine right or left to an open magazine mount, the magazine is slid into the magazine mount and then the magazine is released by the magazine picker 70. Requested disks are then withdrawn from the magazine by disk loader 54 and transported to the disk drive 56. After processing, the disk is returned to the magazine and the magazine can be picked by the magazine picker 70, slide out of the magazine mount, transported to an open magazine storage bin, inserted into the bin and then released by the magazine picker 70. The back magazine picker 72 and the back transport assembly 112 operates in the same manner. It should be understood that multiple transport assemblies 110 may be provided for operation on a single rack gear 114 at the front and/or the back of the library with multiple clusters located between the transport assemblies 110. With this arrangement, operation of the library is enhanced by exchange of media between the transport assemblies. It should be understood that a majority of the magazine storage bins 22, a majority of the disk drives and disk loaders 50 and 52 at the right and left ends of the magazine storage bins and a majority of the magazine mounts at the right and left ends of the magazine storage bins have been omitted for clarity.

Figure 6:
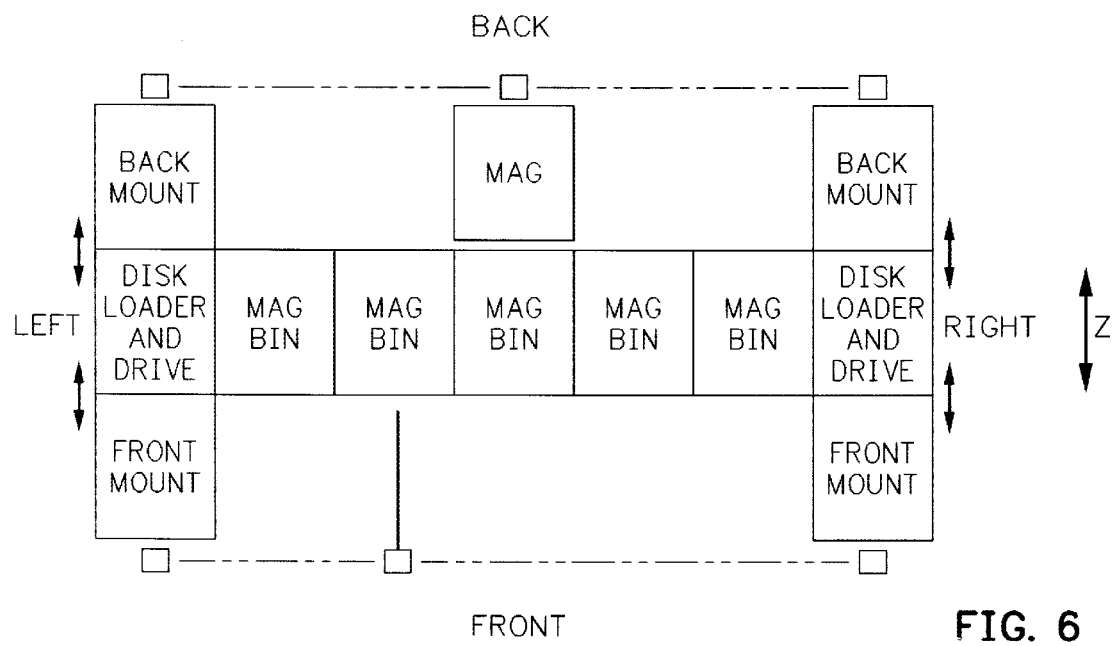
FIG. 6 is a schematic plan view of a preferred embodiment of the invention.
Figure 7:
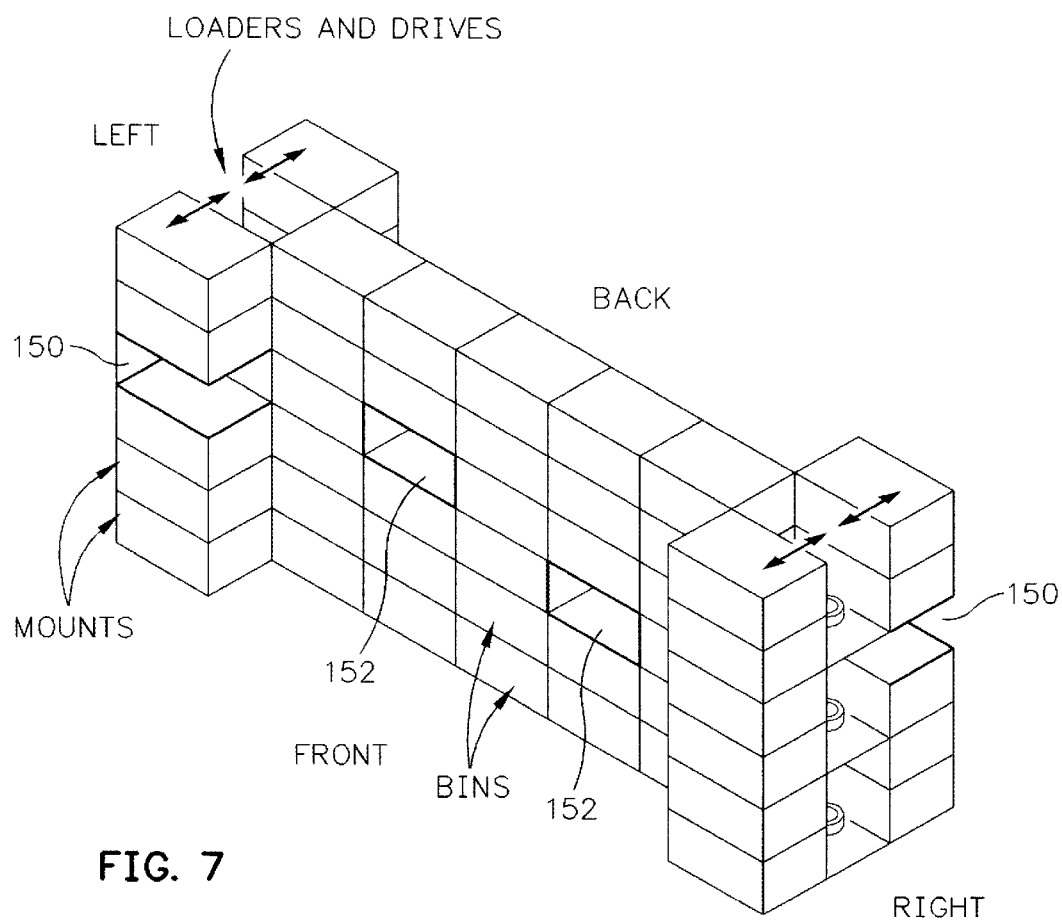
FIG. 7 is a schematic isometric view of the preferred embodiment of the invention.
Figure 8:
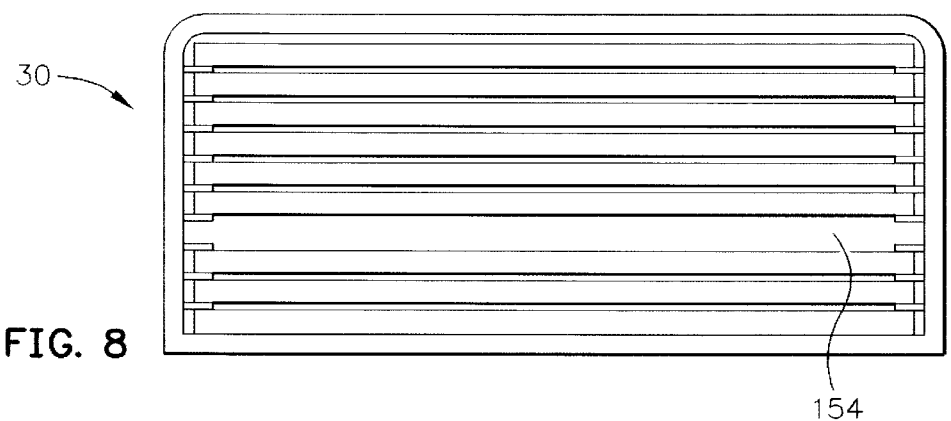
FIG. 8 is a schematic view of a magazine partially filled with disks.

Schematic illustrations of a complete set of magazine storage bins, disk drive and disk loader combinations, and magazine mounts are shown in FIGS. 6–8. A top schematic illustration of the library of FIG. 7 is shown schematically in FIG. 6. Shown are 30 magazine storage bins, 3 disk drive and disk loader combinations at each of the right and left ends of the magazines storage bins and front and back columns of magazine mounts adjacent front and back sides of the disk drives and disk loader combinations at each of the right and left ends, each disk drive and disk loader combination having a cluster of four magazine mounts which comprises two magazine mounts at a front side and two magazine mounts at a back side. The magazine mounts are completely filled with magazines except for locations 150 and the magazine storage bins are completely filled except for bins 152. When there is an empty magazine mount in a cluster of magazine mounts, this cluster becomes a floating cluster. A floating cluster enables magazines to be exchanged so that requested disks can be processed in a highly efficient manner. The empty magazine bins 152 also support this exchange scheme. As shown in FIG. 8, a magazine may be completely filled with disks except for one receptacle shown at 154. By providing each magazine in the library with an open receptacle 154, the exchange scheme to facilitate processing is still further enhanced at the disk drive and disk loader combination locations.

Figure 9:
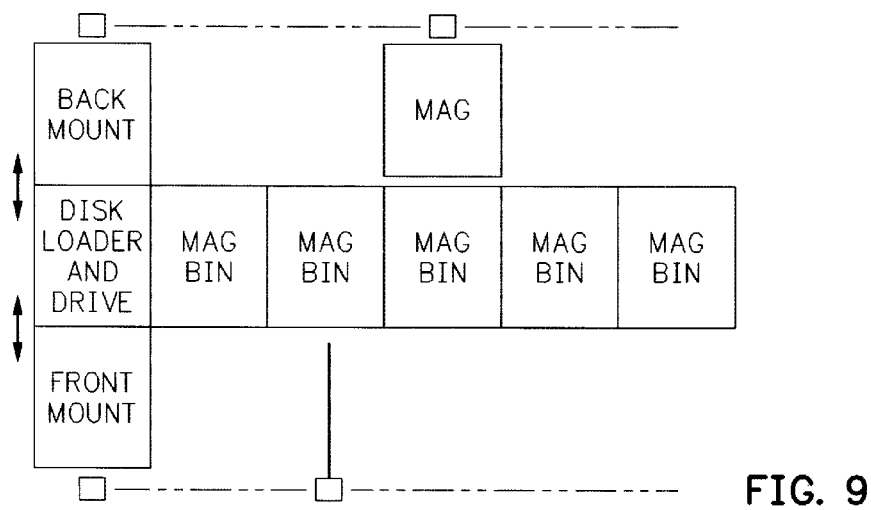
FIG. 9 is a schematic plan view of another embodiment of the invention.
Figure 10:
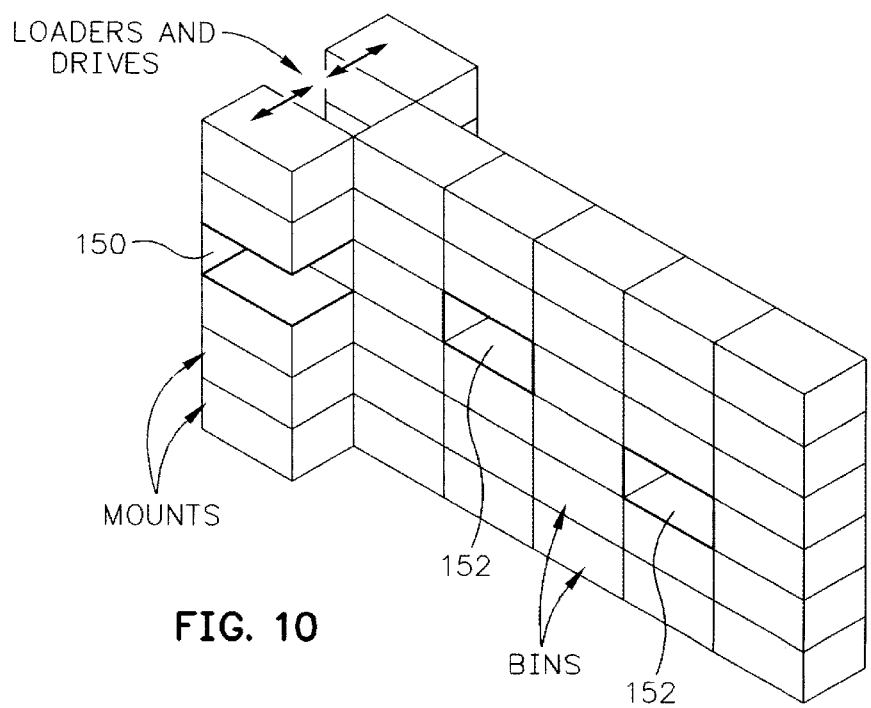
FIG. 10 is a schematic isometric view of the embodiment shown in FIG. 9.

Another embodiment of the library is shown in FIGS. 9 and 10. In this library, only one end of the magazine bins is provided with disk drive and disk loader combinations and clusters of magazine mounts. This arrangement could be used by a customer which needs to store large volumes of data but has less of a processing load. Both embodiments of the invention can be easily expanded for an increasing storage capability by adding additional columns of magazine bins and additional lengths of rack gears. The only difference in the embodiment shown in FIG. 6 is that one of the ends of disk drives and disk loader combinations and clusters of magazine mounts would have to be moved over to accommodate the additional magazine bins and rack gears.

Figure 11A:
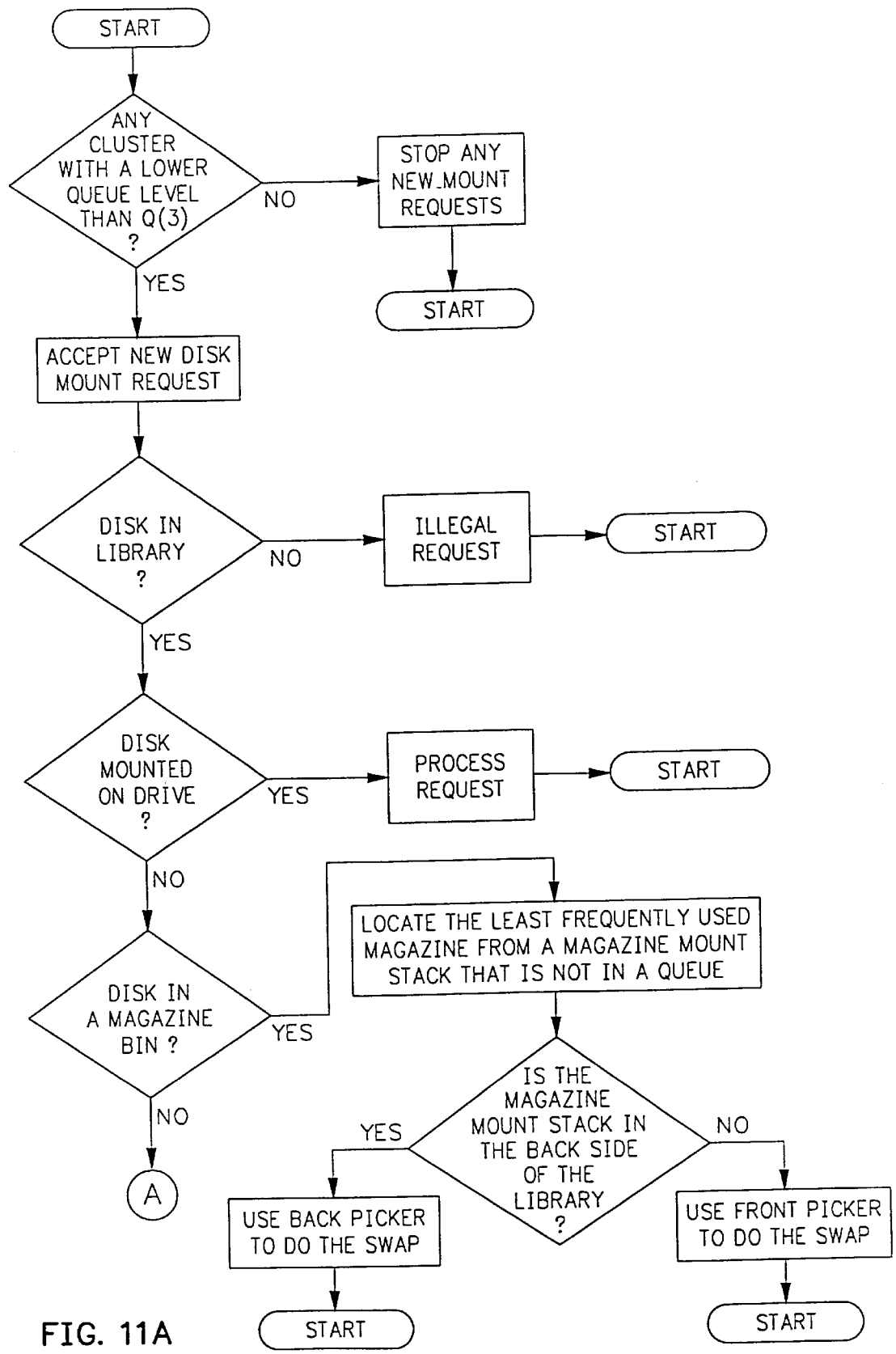
FIGS. 11A and 11B are a logic block diagrams for operating the storage library.
Figure 11B:
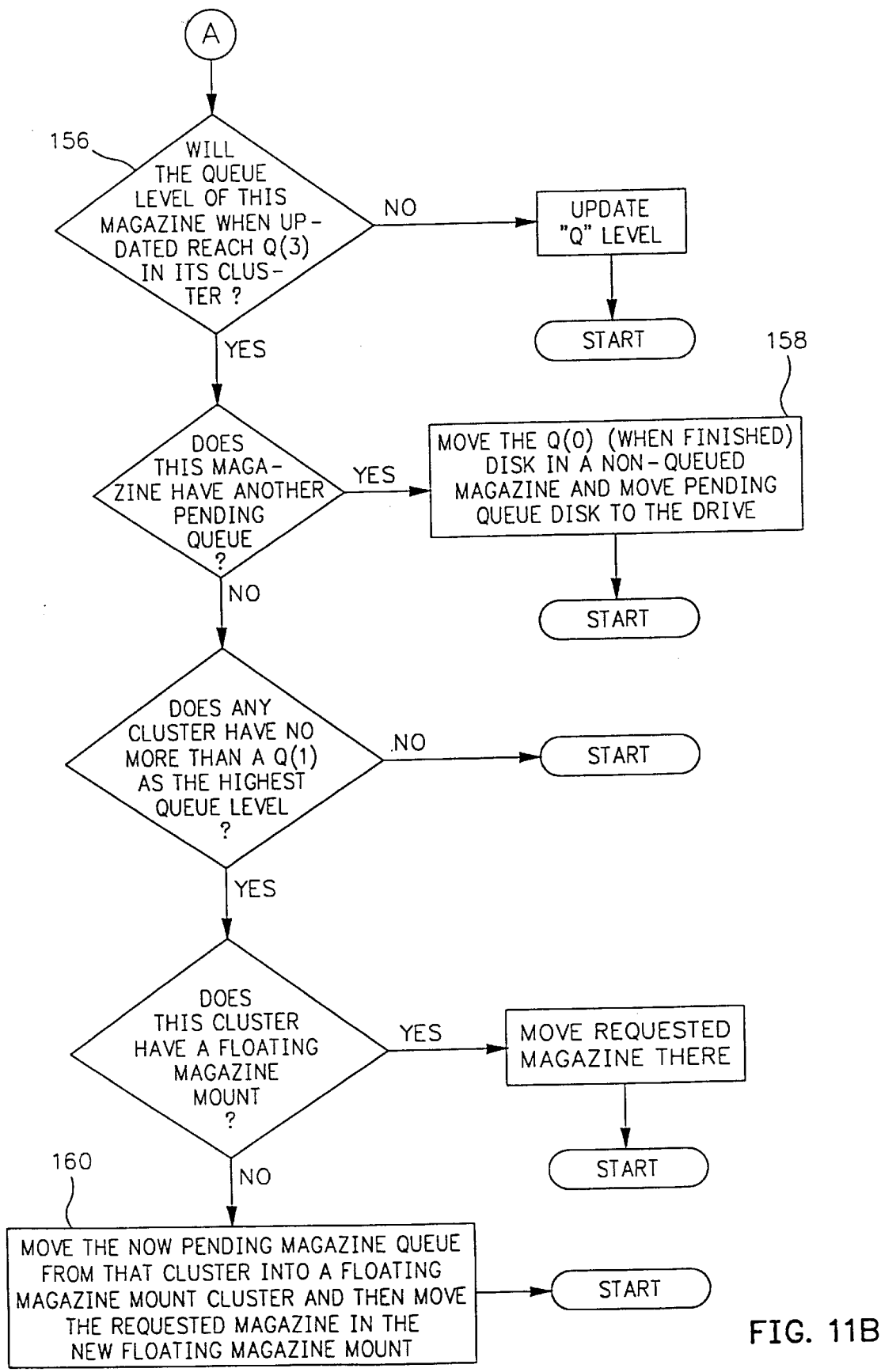
Figure 12:
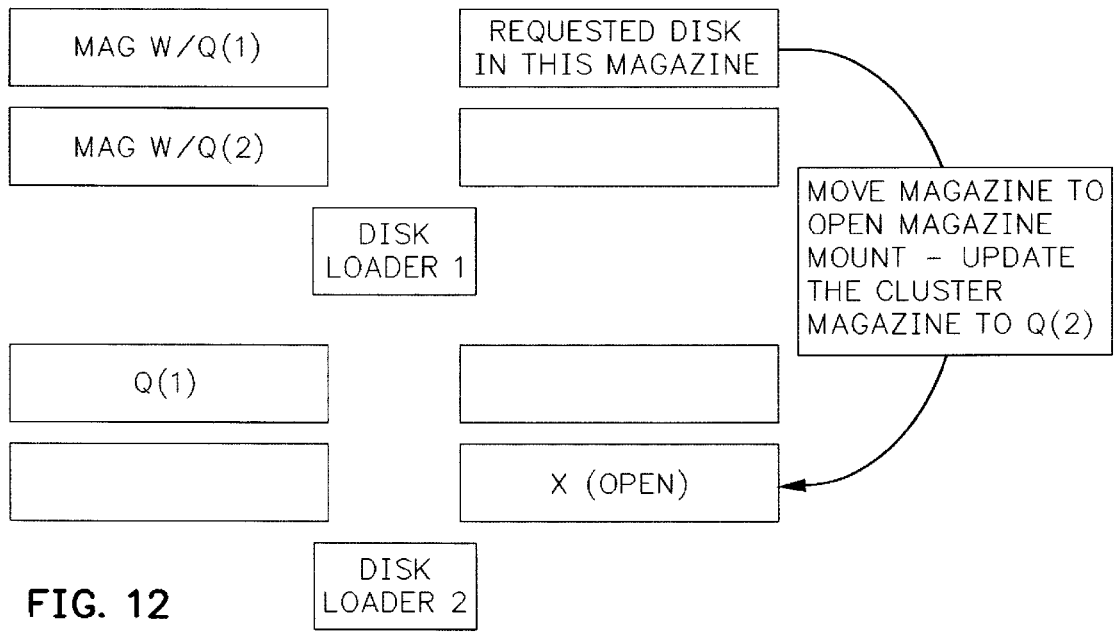
FIG. 12 is a block diagram of one scenario for the last block of FIG. 11.
Figure 13:
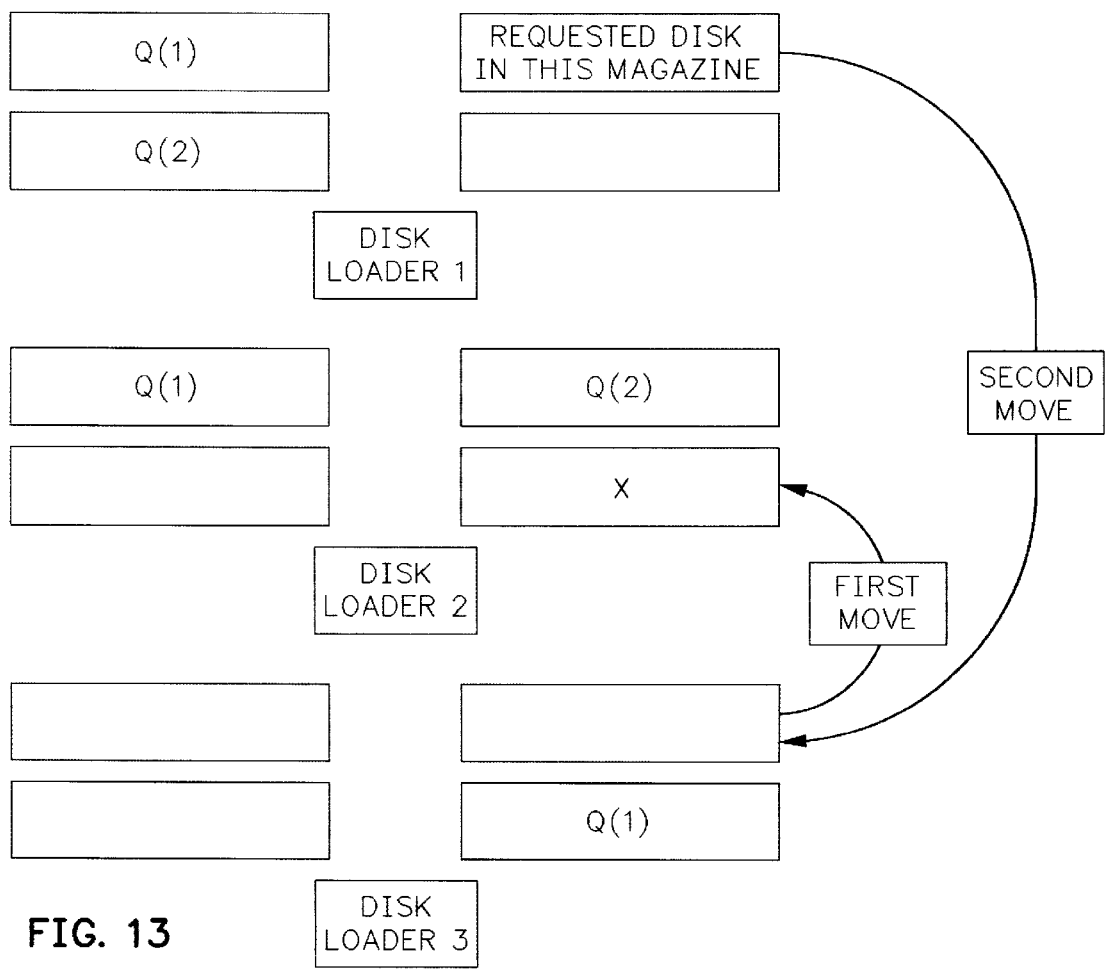
FIG. 13 is a block diagram of another scenario for the last block of FIG. 11.

A block diagram of a scheme for efficiently processing disk volumes is illustrated in FIGS. 11A and 11B. The scheme operates according to the queue level of a cluster of magazine mounts and of the queue of a magazine when it is added to a floating cluster. If none of the clusters has a queue level less than 3, new mount requests are not processed until one of the clusters has a queue level less than 3. If the requested disk is in a magazine bin the logic locates the least frequently used magazine in a magazine mount that is not in a queue and performs a swap with the requested magazine in the magazine bin. If the answer is no to the question whether a disk is in a magazine bin, the magazine has to be in a cluster which is then processed by block 156 and the logic thereafter. If the magazine having the requested disk has another pending queue, the requested disk can be swapped with a disk in a magazine which does not have a pending queue, as shown in block 158. This is the reason for each of the magazines having an empty receptacle, as shown in FIG. 7. If any cluster has a queue level of 1 or none, the question is asked whether this cluster has a floating magazine mount. If the answer is no, a swap of magazines is implemented according to block 160. Two possible scenarios for the block 160 are illustrated in FIGS. 12 and 13. In FIG. 12, 2 clusters are involved with 1 of the clusters being a floating cluster and in FIG. 13, 3 clusters are involved, with 1 of the clusters being a floating cluster. It can be seen that the number of floating clusters and the number of empty bins can be adjusted for the particular configuration of the library and the needs of the customer.

An exemplary library includes 16 columns of magazine bins, each column containing 8 bins for a total of 128 bins. All of these bins may be filled with magazines, except for 8, which may be considered floating bins. Accordingly, 120 bins are filled with magazines. Each magazine may have 9 receptacles which are all filled, except for 1. Eight disk drive and disk loader combinations may be provided at each of the right and left ends of the magazine bins. At each of the right and left ends, there may be located 8 clusters of magazine mounts, each cluster containing 4 magazine mounts, 2 on the front side of a respective disk drive and disk loader combination and 2 on a back side of a disk drive and disk loader combination. Each of the magazine mounts may contain a magazine, except for 4 magazine mounts on each side of the magazine bins. This means that there will be 4 floating clusters on each side of the magazine bins. Accordingly, the right stack of clusters will contain 28 magazines and the left stack of clusters will contain 28 magazines giving a total of 56 magazines contained by the magazine mounts. When this is added to the magazines contained by the magazine bins, the total number of magazines is 176. Since each magazine contains 8 disks, the total number of disks in the library is 1,408. With today's optimal disk capacity, this is almost a terabyte. This library can, of course, be scaled up or down depending upon the need of the customer and can be provided with different proportions of floating bins and floating clusters to handle the amount of processing expected.

It should be understood that the invention can be employed for any type of medium, whether it be magnetic or optical disks or magnetic tape. If magnetic tape is employed, magnetic tape cartridges can be withdrawn from the cartridge receptacles by cartridge pickers, after which they are transferred to cartridge mounts in a cluster similar to that described hereinabove. Instead of employing a disk loader, a cartridge picker would be employed between the front and back pairs of cartridge mounts for inserting the cartridges in a drive.

Although the invention has been described in terms of the specific embodiments, the inventor contemplates modifications and substitutions to various components of the invention which would occur to a person of ordinary skill in the art, and therefore, would be in the scope of the invention, which is to be limited only by the claims which follow.

I claim:

1. A modularized library for magazines which contain removable units of data storage media (volumes) comprising:

a plurality of magazine storage bins which have front and back sides and first and second ends;

each storage bin having a front opening and a back opening and being capable of slidably receiving a magazine from either opening, storing the magazine and slidably giving the magazine from either opening;

at least one media drive and media loader combination located at at least one of the ends of the magazine storage bins and having front and back sides;

a front magazine mount and a back magazine mount located adjacent the front side and back side, respectively, of the media drive and media loader combination, each magazine mount being capable of receiving and supporting a magazine adjacent a respective media drive and media loader combination;

each media loader being capable of transporting a medium between a magazine in any respective adjacent magazine mount and a respective media drive; and a front magazine transport assembly capable of transporting a magazine from the front side of any magazine storage bin to any front magazine mount and a back magazine transport assembly capable of transporting a magazine from the back side of any magazine storage bin to any back magazine mount.

2. A library as claimed in claim 1 including:

at least one media drive and a media loader combination located at each of said first and second ends of the plurality of magazine storage bins.

3. A library as claimed in claim 2 including:

a cluster of magazine mounts located adjacent each media loader and media drive combination, each cluster of magazine mounts comprising a pair of front magazine mounts adjacent the media loader and media drive combination and a pair of back magazine mounts adjacent the media loader and media drive combination.

4. A library as claimed in claim 2 including:

said plurality of magazine storage bins being arranged in rows and columns, each row having a plurality of magazine storage bins and each column having a plurality of magazine storage bins;

a plurality of first media drive and media loader combinations located at the first end of the magazine storage bins and a plurality of second media drive and media loader combinations located at the second end of the magazine storage bins; and a cluster of magazine mounts located adjacent each media loader and media drive combination, each cluster of magazine mounts comprising a pair of front magazine mounts adjacent the media loader and media drive combination and a pair of back magazine mounts adjacent the media loader and media drive combination.

5. A library as claimed in claim 2 including:

each magazine transport assembly including a magazine picker, a horizontal track, a vertical track and means for transporting the magazine picker along the horizontal and vertical tracks.

6. A library as claimed in claim 1 including:

the front magazine mount and the back magazine mount having openings which face one another; and each magazine mount being capable of slidably receiving and giving a magazine through its opening.

7. A library as claimed in claim 6 including:

each magazine having one of a rail and a slot and each magazine mount having the other of a rail and a slot, the slot slidably receiving the rail so that a magazine is secured to a magazine mount when slidably received by the magazine mount.

8. A library as claimed in claim 2 including:

a plurality of magazines, each magazine having a plurality of receptacles which contain volumes; and magazines mounted in the magazine storage bins and magazines mounted in each of the magazine mounts.

9. A library as claimed in claim 8 including:

each magazine having a receptacle which is empty.

10. A library as claimed in claim 2 including:

said plurality of magazine storage bins being arranged in rows and columns, each row having a plurality of magazine storage bins and each column having a plurality of magazine storage bins;

a plurality of first media drive and media loader combinations located at the first end of the magazine storage bins and a plurality of second media drive and media loader combinations located at the second end of the magazine storage bins; and a cluster of magazine mounts located adjacent each media loader and media drive combination, each cluster of magazine mounts comprising a pair of front magazine mounts adjacent the media loader and media drive combination and a pair of back magazine mounts adjacent the media loader and media drive combination.

11. A library as claimed in claim 10 including:

a plurality of magazines, each magazine having a plurality of receptacles for containing a plurality of volumes;

magazines mounted in the magazine storage bins and magazines mounted in the magazine mounts; and at least one of the magazine storage bins being empty and one of the magazine mounts in at least one of the clusters at each of the right and left ends of the magazine storage bins being empty.

12. A library as claimed in claim 11 including:

each magazine having a receptacle which is empty.

13. A library as claimed in claim 12 including:

each magazine transport assembly including a magazine picker, a horizontal track, a vertical track and means for transporting the magazine picker along the horizontal and vertical tracks.

14. A library as claimed in claim 13 including:

the front magazine mount and the back magazine mount having openings which face one another; and each magazine mount being capable of slidably receiving and giving a magazine through its opening.

15. A library as claimed in claim 14 including:

each magazine having one of a rail and a slot and each magazine mount having the other of a rail and a slot, the slot slidably receiving the rail so that a magazine is secured to a magazine mount when slidably received by the magazine mount.

16. A modularized media library comprising:

means for storing media at a plurality of storage locations which are located in a vertical plane;

first and second media drive means located at first and second ends, respectively, of the storage locations for recording and playing information signals on the media;

front and back media mount means adjacent front and back sides respectively of each of said first and second media drive means;

front media transport means for transporting media between the storage locations and any of the front media mount means and back media transport means for transporting media between the storage locations and any of the back media mount means; and first media transport means for transporting media between any of the front and back media mount means adjacent the first media drive means and second media transport means for transporting media between any of the front and back media mount means adjacent the second media drive means.

17. A library as claimed in claim 16 including:

the media mount means having side openings; and the media mount means receiving and giving media through said side openings.

18. A library as claimed in claim 16 including:

said plurality of storage locations being arranged in rows and columns, each row having a plurality of storage locations and each column having a plurality of storage locations;

each of the first and second media drive means including a plurality of media drives; and the media mount means including a cluster of media mounts located adjacent each media drive, each cluster of media mounts comprising a pair of front media mounts adjacent the media drive and a pair of back media mounts adjacent the media drive.

19. A library as claimed in claim 16 including:

each media transport means including a picker, a horizontal track, a vertical track and means for transporting the picker along the horizontal and vertical tracks.

20. A library as claimed in claim 19 including:

the media mount means having side openings; and the media mount means receiving and giving media through said side openings.

21. A library as claimed in claim 20 including:

said plurality of storage locations being arranged in rows and columns, each row having a plurality of storage locations and each column having a plurality of storage locations;

each of the first and second media drive means including a plurality of media drives; and the media mount means including a cluster of media mounts located adjacent each media drive, each cluster of media mounts comprising a pair of front media mounts adjacent the media drive and a pair of back media mounts adjacent the media drive.

22. A library as claimed in claim 21 including:

media mounted at the media storage locations and media mounted in each of the media mounts.

23. A library as claimed in claim 22 including:

some of the media storage locations being empty and some of the media mounts being empty.

* * * * *